United States Patent [19]

McDevitt

[11] 4,342,096
[45] Jul. 27, 1982

[54] VARIABLE PITCH CHARACTER GENERATOR FOR DOT MATRIX PRINTER

[75] Inventor: Bernard J. McDevitt, Norristown, Pa.

[73] Assignee: Sperry Corporation, New York, N.Y.

[21] Appl. No.: 121,845

[22] Filed: Feb. 15, 1980

[51] Int. Cl.³ .............................................. G06F 3/12
[52] U.S. Cl. ................................. 364/900; 101/93.04; 101/93.05; 400/121; 400/124; 340/731; 340/750; 178/15; 178/30; 354/5; 354/7; 364/523
[58] Field of Search ... 364/200 MS File, 900 MS File, 364/518, 519, 520, 521, 522, 523; 354/5, 7, 9, 10, 11, 12; 340/700, 791, 798, 799, 800, 801, 803, 731, 748; 400/121, 124; 101/12, 113; 178/15, 30

[56] References Cited

U.S. PATENT DOCUMENTS

| | | | |
|---|---|---|---|
| 3,165,045 | 1/1965 | Troll | 364/900 |
| 3,512,139 | 5/1970 | Reynolds, Jr. et al. | 364/900 |
| 3,544,967 | 12/1970 | Sallach et al. | 364/900 |
| 3,588,872 | 6/1971 | Kolb et al. | 354/7 |
| 3,648,245 | 3/1972 | Dodds, Jr. et al. | 364/200 |
| 3,648,271 | 3/1972 | McConnell et al. | 340/324 A |
| 3,654,609 | 4/1972 | Bluethman | 364/200 |
| 3,729,714 | 4/1973 | Heard | 364/900 |
| 3,877,007 | 4/1975 | Fishman | 340/324 AD |
| 3,896,428 | 7/1975 | Williams | 340/324 AD |
| 3,931,614 | 1/1976 | Vasa et al. | 364/900 |
| 3,999,168 | 12/1976 | Findley et al. | 364/900 |
| 4,000,486 | 12/1976 | Schomburg | 364/200 |
| 4,044,363 | 8/1977 | Morgan | 354/5 |
| 4,069,511 | 1/1978 | Lelke | 364/200 |
| 4,079,458 | 3/1978 | Rider et al. | 364/900 |
| 4,107,786 | 8/1978 | Masaki et al. | 364/900 |
| 4,122,520 | 10/1978 | Adamchick et al. | 364/200 |
| 4,141,079 | 2/1979 | Grier et al. | 364/900 |
| 4,222,643 | 9/1980 | Kitamura et al. | 354/7 |
| 4,242,678 | 12/1980 | Somerville | 340/728 |
| 4,247,207 | 1/1981 | Klimek et al. | 400/121 |
| 4,254,468 | 3/1981 | Craig | 364/523 |
| 4,283,724 | 8/1981 | Edwards | 340/731 |
| 4,286,329 | 8/1981 | Goertzel et al. | 364/900 |

*Primary Examiner*—James D. Thomas
*Assistant Examiner*—A. E. Williams, Jr.
*Attorney, Agent, or Firm*—James R. Bell; Marshall M. Truex

[57] ABSTRACT

Proportional spacing of characters, for example by a laser-xerographic printer, is achieved using a character generator memory, for example a random access memory (RAM), to store the characters of a font in a plurality of variable-size binary matrices. Each column includes at least one parity bit and at least two pitch bits or end of character (EOC) bits. After a character matrix is selected for printing: the columns are transmitted sequentially from the RAM, the bit patterns are decoded as valid and invalid EOC indication signals or as valid and invalid NON-EOC signals, and the parity of each column is checked. Also, stop printing circuitry inhibits operation of the dot matrix printer when the parity checker indicates no error but the pitch bit decoder derives an invalid EOC or NON-EOC SIGNAL.

2 Claims, 5 Drawing Figures

VARIABLE PITCH CHARACTER GENERATOR FOR DOT MATRIX PRINTER

BACKGROUND OF THE INVENTION

This invention relates to an improvement in character generators in dot matrix printers. In particular, the invention relates to a method and means for determining when the end of a character shape has been printed and for providing proportionally spaced character printing.

Character generators are used with dot matrix printers of both the non-impact and impact type. Each character of a font is stored in a character generator memory as a character matrix of binary ones and zeros. A selected character matrix controls the printing of a pattern of dots on a page. In laser-xerographic printers, a sweeping laser beam is modulated according to the pattern of ones and zeros found in a portion of the selected character matrix of the character generator. The beam is caused to sweep periodically across a photoconducting drum by a rotating multifaceted mirror. The modulated laser light when it impinges on the photoconducting drum leaves an electrostatic image behind on the drum. Rotation of the drum and multifaceted mirror as well as transmission of the data from the character generator are controlled and synchronized by a printer controller.

One method of printing a line of characters from a character generator with a laser-xerographic printer involves storing each of the character shapes in a standard size character matrix within the character generator memory. Imaging of each character matrix to be printed requires a fixed number of laser sweeps across a fixed number of dot positions in order to print the matrix. A counter or timing circuitry counts the number of dots crossed by the laser as it sweeps across the drum. Each time during the sweep that the count reaches a fixed number it begins over to start another character matrix which is associated with an adjacent character shape to be printed. This method, however, does not allow for proportional spacing between printed characters, that is, although not all character shapes have the same width, all character matrices used to store and print the character shapes are of the same size, and hence each character printed occupies the same amount of space on a page.

Several U.S. patents disclose various approaches for character proportional spacing or the intermixing of various character widths when printing. See U.S. Pat. Nos. 3,165,045; 3,729,714; 3,999,168; 4,044,363; 4,079,458; and 4,107,786. Each of these patents discloses the use of additional counting or timing circuitry sometimes triggered by end of character or pitch bit information contained in the stored character data in order to provide proportional spacing.

SUMMARY OF THE INVENTION

In the present invention, an improved means and method for proportional spaced printing of characters by a dot matrix printer using a character generator is disclosed. A character generator memory stores a font in the form of a plurality of character matrices of binary ones and zeros defining the shape of each of the characters. Each character matrix contains at least one end of character bit which signifies the end of the character shape. Each character matrix has an assigned starting address within the character generator memory.

An output line buffer memory stores a series of character matrix starting addresses in the order in which they are to be printed in a character line. An output line buffer address register/counter selects sequentially each of the starting addresses as the counter increments. The selected starting address for any given increment of the counter is transmitted to a character generator address register/counter and loaded therein. In accordance with the loaded starting address, the counter selects a character matrix for transmission from the character generator memory to the printer electronics. In the preferred embodiment, a portion of the selected character matrix is transmitted to the printer electronics with each increment of the character generator address counter. The character generator address counter is clocked by a dot clock signal received from the printer controller and formed by a phase locked oscillator within the printer controller. Each portion of the character matrix selected contains a plurality of character dot data and at least one end of character flag bit position. When an end of character bit is detected, an end of character signal is sent to both the character generator address counter and the output line buffer address counter.

The arrival of the end of character signal at the character generator address register loads the selected character matrix starting address from the output line buffer memory into the character generator address counter. At the same time the end of character signal arriving at the output line buffer address counter increments the counter to select the next character matrix starting address to be loaded into the character generator address counter upon arrival of the next end of character signal.

Error correction coding capability can be added by providing for a plurality of end of character flag bit positions. In the preferred embodiment, three ends of character flag bit positions are provided which enables decode circuitry to correct a one bit error in the end of character flag bit pattern. When a parity bit is also added to each portion of the character matrix being printed then a stop print interrupt signal can be generated if an invalid end of character code is detected along with a no error parity check.

It is an advantage of the present invention to provide character proportional spacing by dot matrix printers without the need for additional timing or counter circuitry.

It is a further advantage of the present invention to provide easily error correction coding capability to the character proportional spacing technique.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE DRAWINGS

Figure 1:
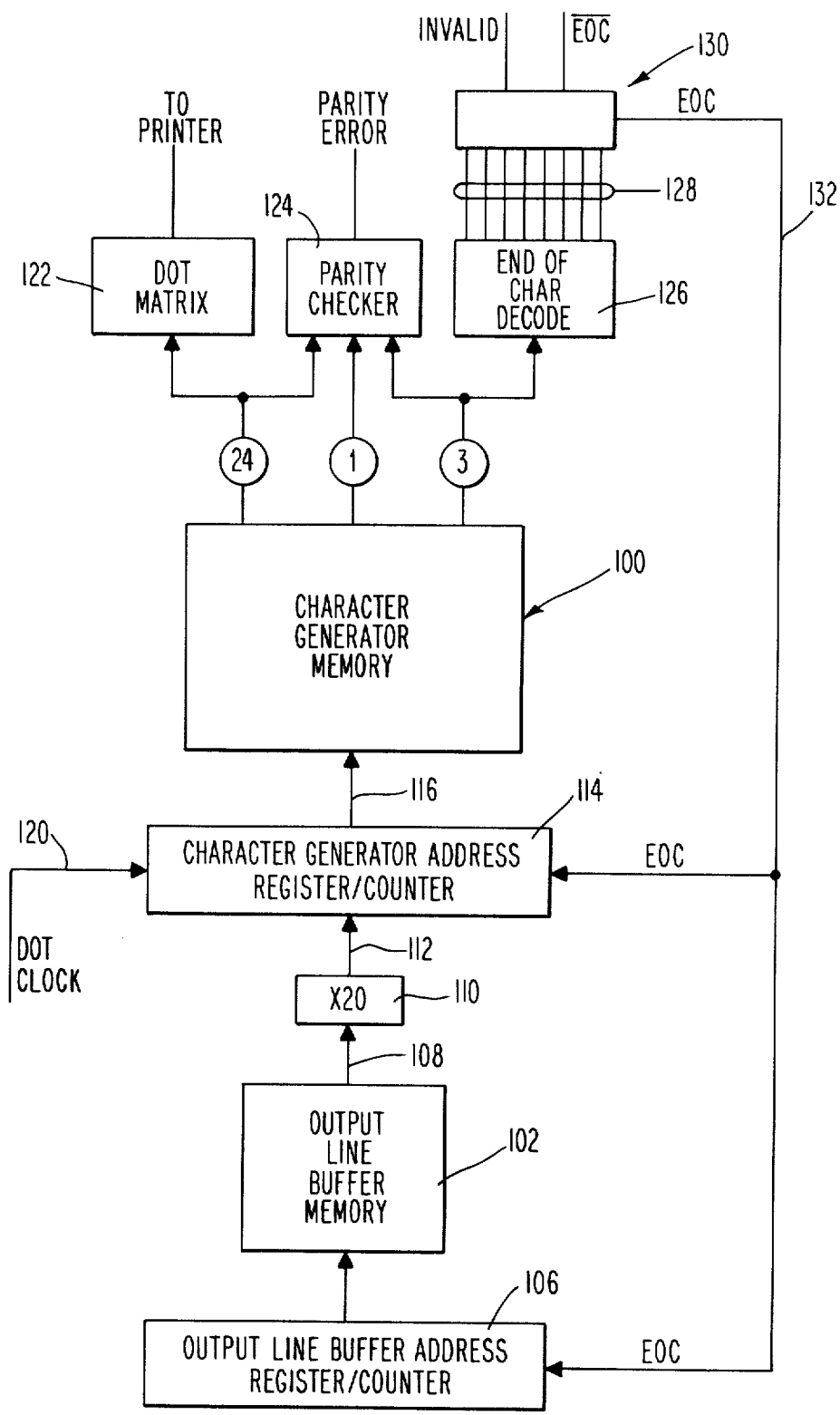
FIG. 1 is a block diagram of one embodiment of the invention.
Figures 2, 3:
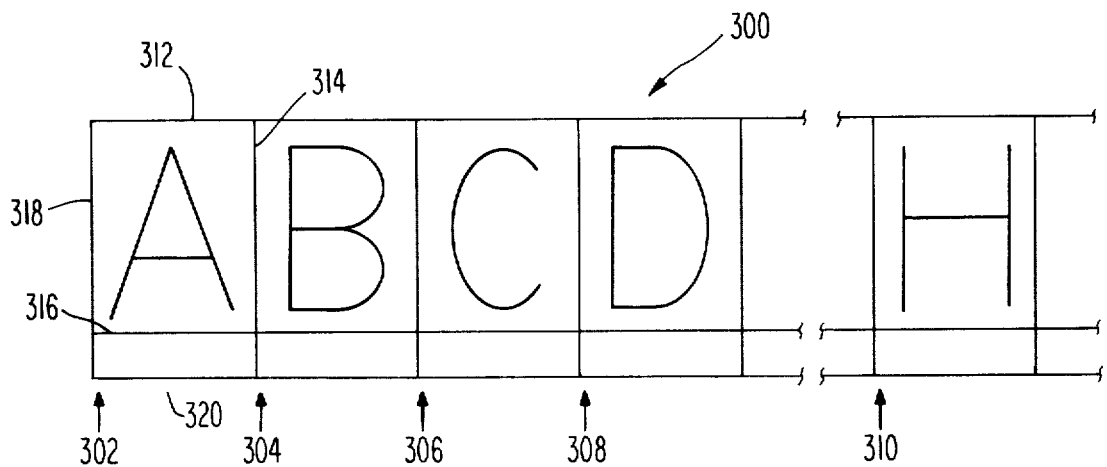
FIG. 2 shows a portion of the character generator memory of one embodiment of the invention.
FIG. 3 shows a second larger portion of the character generator memory of one embodiment of the invention.

Referring to FIGS. 1, 2 and 3, a character generator memory designated generally 100 in FIG. 1 for use with a dot matrix printer contains a plurality of print patterns which define a font. In the preferred embodiment, character generator memory 100 is a 28×5K bit memory space comprised of a plurality of Intel 2114 static random access memories (RAM).

FIG. 2 shows a print pattern with the letter E designated generally 200 in detail. Each print pattern is stored as a pattern of binary ones and binary zeroes within a character matrix space. Where a binary one is present in the character matrix, a corresponding dot will be printed by the dot matrix printer, where a binary zero is present, a space will be left by the printer. Of course, the generator and printer could operate in the opposite sense where binary zeroes would cause a dot to be printed. In the preferred embodiment, each matrix space alloted for an associated character shape from the font is twenty columns or bits wide, each column being twenty eight rows or bits long. Only twenty four rows are allotted for the character shape. The purpose of the remaining four rows will be explained later.

A line of print comprises a series of adjacent characters such as character E in FIG. 2. Up to 204 characters may be printed in a single line in the preferred embodiment. In the laser xerographic printer previously described, portions of the adjacent characters are imaged on the photoconducting drum as the laser sweeps across the drum. In some laser xerographic printers, one row of each adjacent character in a line may be imaged during one laser sweep in which case it would take twenty four laser sweeps to complete a line of characters, where a character is described as in FIG. 2. In the preferred embodiment of this invention, six modulated laser beams are simultaneously swept across the photoconducting drum by the rotating multi-faceted mirror. Each beam prints one row; six rows are printed per sweep; and four sweeps are needed to print a complete character line.

FIG. 3 is a representation of the storage of the font designated generally 300 in the character generator memory. Each character is stored in a similar manner to letter E in FIG. 2 and requires twenty columns or addresses. Each character has an assigned starting address such as starting address labelled 302 through 310. The address for character A might be zero; for character B, 20; for character C, 40, and so on for the remainder of the font.

If the font contains 256 characters, for example, then the memory requires 256 starting addresses or 5120 separate 28 bit addresses (20 addresses for each of the 256 characters). A character matrix space for the letter A defined by lines 312, 314, 316 and 318 is twenty columns wide from lines 318 to 314 and twenty four rows long from lines 312 to 316. From line 316 to line 320 is four rows long. Each character matrix space is similarly defined.

The purpose for the four bit rows between lines 316 and 320 is better understood in reference to FIG. 2. In each 28 bit column of a character matrix space, three rows 25, 26, and 27, are reserved for an end of character (EOC) flag in the preferred embodiment. Only one bit is required to provide an EOC flag, but in a character generator using a single bit EOC flag, printing would have to terminate in the event of a parity error because it would be impossible to determine if the bit in error was the EOC flag bit. An error in the data bits (dots) would cause dots to be added or omitted, but would not generally affect readability of the output (this is especially true of character generators with high dot densities). With an error in the dot data it would be possible to continue printing until such time as the memory could be corrected. However, with the single bit EOC flag an error in the EOC flag bit would generally make the output unreadable, necessitating stopping of the printer until the memory was corrected. With an encoded EOC flag the probability of an error affecting the readability of the output is greatly decreased, therefore, allowing the printer to continue printing with an error in the character generator.

As a portion of each column of the character matrix is transmitted for printing, the EOC flag bit portion for that column is detected and decoded as NOT EOC ($\overline{EOC}$) or EOC. If EOC is decoded then the printing of that character matrix stops at that column, and the printing of the next character in the line is begun.

In the preferred embodiment, the valid $\overline{EOC}$ bit pattern is programmed as 011 in rows 25, 26 and 27, respectively, while the valid EOC bit pattern is programmed as 100. Only one column contains the EOC bit pattern. Of course, other three bit patterns could be used for EOC or $\overline{EOC}$, and EOC flags of greater than three bits could also be used. In FIG. 2, for the letter E, the EOC bit pattern 100 occurs in column 18, two columns before the end of the character matrix space. For the letter I which is narrower than E and requires less print space, the EOC bit pattern might occur in column 16 or column 17. Hence, if the letter I preceded the letter E, they would be printed closer together than they otherwise would have been without an EOC flag. This results in proportional spacing between characters.

Row 28 in FIG. 2, is a parity bit position which checks the overall parity for the entire twenty eight bit column including the EOC flag bit positions. In the preferred embodiment, an odd parity system is chosen. In FIG. 3, the EOC flag bit position and the parity bit position are located in the region between lines 316 and 320 for each of the characters.

Referring now to FIG. 1, the output line buffer memory 102 contains the starting addresses of a plurality of character matrices associated with a line of character shapes to be printed. Each starting address is stored as an eight bit word in memory 102. An output line buffer address register/counter 106 is connected to memory 102. Each time the counter 106 increments, an address in the memory 102 is chosen and transmitted as an eight bit word over line 108 to multiplier 110. Multiplier 110 multiplies the eight bit word of the memory 102 by twenty to form the proper starting address for selection of a character matrix stored in the character generator memory 100.

As a result of a multiplication by twenty, the eight bit long word from output line buffer memory 102 becomes a thirteen bit word transmitted over line 112 to a character generator address register/counter 114 where it is loaded when the EOC from the previous character is detected. A dot clock signal 120 formed by a phase locked oscillator within the printer controller increments the counter 114.

The loaded address in counter 114 is first transmitted over line 116 as a 13 bit word to select a character matrix in character generator memory 100 for transmission and printing. Each increment of the counter 114 causes a 28 bit column of the selected character matrix to be transmitted from character generator memory 100. Twenty four bits associated with dot print information of the character shape described previously are transmitted to dot matrix circuitry 122 and to parity checking circuitry 124.

In the preferred embodiment, dot matrix circuitry 122 determines which six bits of the twenty four bits received are to be transmitted during the current laser sweep. This portion of the overall printing system forms no part of this invention and therefore is not described in detail herein.

The three EOC flag bits are transmitted to EOC decode circuitry designated generally 126 and to parity checking circuitry 124. The remaining parity bit is transmitted to circuitry 124 only. EOC decode circuitry 126 decodes the three bit input to provide eight parallel outputs shown as lines 128 in FIG. 1. Three to eight decode circuitry is conventional and well known and is described herein only as box 126.

First logic circuitry 130 receives the eight inputs of circuitry 126 and provides three outputs labelled Invalid, $\overline{EOC}$ and EOC. The EOC signal represents successful detection of a transmitted EOC flag bit pattern with or without a one bit error. The EOC signal is then transmitted over line 132 to the character generator address register/counter 114 and to the output line buffer address register/counter 106. The EOC signal to counter 114 loads a starting address from output line buffer memory 102 chosen by the counter 106 on the previous EOC signal. The EOC signal now loading counter 114 also increments counter 106 to select a new starting address in memory 102 which will be the next starting address which will be loaded into counter 114 on the next EOC signal. The starting address from memory 102 is loaded into counter 114 on the first dot clock signal received after the EOC signal has arrived at counter 114.

Three bit positions are chosen in the preferred embodiment for the EOC flag because some means of error correction capability is desired. For example, it is assumed that for a valid EOC pattern of 100, the Invalid EOC correctable patterns assuming one bit in error are:
000 assuming one bit dropped;
110 assuming one bit picked up;
101 assuming one bit picked up.

Similarly, for a valid $\overline{EOC}$ of 011, the Invalid EOC correctable patterns are:
010 assuming one bit dropped;
001 assuming one bit dropped;
111 assuming one bit picked up.

Figure 4:
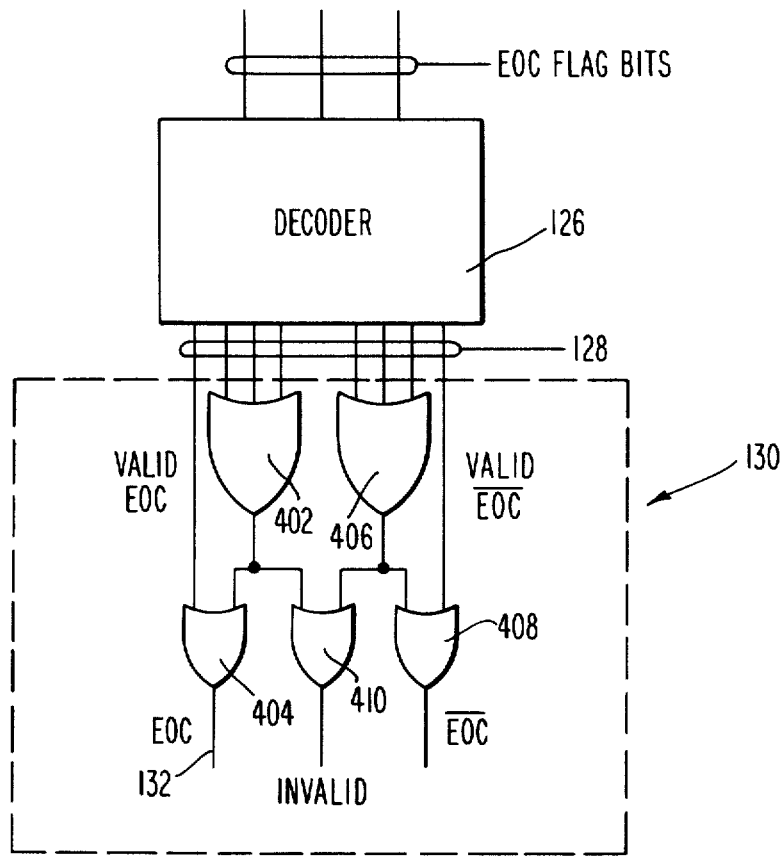
FIG. 4 shows an enlarged and more detailed portion of the block diagram of FIG. 1.

An EOC signal is sent over line 132 any time a valid or Invalid EOC signal is decoded, that is, any time a 000, 100, 101, 110 is detected. Hence, the first logic decode circuitry shown in more detail in FIG. 4 first inputs the Invalid EOC patterns into OR GATE 402 and then takes the output of OR GATE 402 and inputs it into OR GATE 404 with the valid EOC pattern output from decoder 126. Similarly, the Invalid $\overline{EOC}$ passes through OR GATE 406 to OR GATE 408. Valid $\overline{EOC}$ pattern is also transmitted to OR GATE 408. The output from OR GATE 404 is transmitted over line 132 in FIG. 1. The outputs of OR GATE 402 and 406 are also transmitted to OR GATE 410 to provide an overall Invalid output signal.

Parity checker circuitry 124 counts the number of binary ones in the 28 bit column transmitted from character generator memory 100. Circuitry 124 is formed by cascading 74S280 parity generator/checkers in a well known fashion. In an odd parity system if there are an even number of binary ones in the first 27 bit positions then the 28th bit position or parity bit position is assigned a binary one. If there are already an odd number of binary ones in the first 27 bit positions then the parity bit is assigned a binary zero. In either case the 28 bits will contain an odd number of binary ones. If one of the bits transmitted is in error then an even number of binary ones will be counted by circuitry 124 and a high signal will be transmitted from the circuitry 124 as a parity error signal. Of course, if there are an even number of bits in error when the 28 bit word is transmitted then the number of binary ones present will still be odd and the parity checker will erroneously indicate no error.

If the output of the parity checker circuitry 124 indicates no parity error and if there is an invalid signal from the first logic circuitry 130 then it can be assumed that there are two bits in error in the column being read and that at least one of the bits (and possibly both) was in the encoded EOC flag. In such an instance, it is likely that a meaningful indication for an end of character can not be determined. Therefore, printing must stop until the error is corrected.

Figure 5:
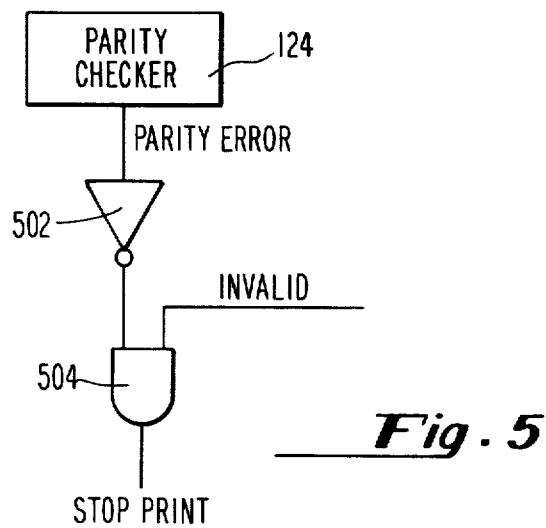
FIG. 5 shows another portion of one embodiment of the invention.

FIG. 5 shows the parity error output from parity checker 124 being inverted by inverter 502 before being transmitted to AND gate 504. The other input to AND gate 504 is Invalid output signal from first logic circuitry 130. Hence, when the parity checker indicates no error but the first logic circuitry indicates an Invalid EOC or an Invalid $\overline{EOC}$, a stop print signal from AND gate 504 is transmitted.

While the present invention has been disclosed in connection with the preferred embodiment thereof, it should be understood that there may be other embodiments which fall in the spirit and scope of the invention as defined by the following claims.

What is claimed:

1. A dot matrix printing apparatus for printing a series of character shapes with proportional spacing and having a character generator memory for storing each of a plurality of character shapes as a pattern of binary ones and zeros in a character matrix, each of said character matrices comprising a plurality of multiple bit columns wherein the first one said columns is associated with a character starting address, each of said columns comprising at least one parity check bit, said apparatus comprising:
   selection means for selecting a character matrix for printing;
   transmitting means connected to said selection means for transmitting sequentially said columns of said selected character matrices;
   end of character means connected to said selection means and said transmitting means for generating an EOC indication signal to stop transmission of said selected character matrix at one of said sequentially transmitted columns and to signal said selection means for selecting a new character matrix for printing, said end of character means comprising:
   N EOC flag bits within each of said columns where N is an integer greater than or equal to 2, said N EOC flag bits capable of forming $2^N$ bit patterns;
   decoding circuitry for decoding a portion of said $2^N$ bit patterns as valid and invalid EOC indication signals and the remaining portion of said $2^N$ bit patterns as valid and invalid NOT EOC indication signals; and wherein said apparatus further comprises:

parity checking means connected to said character generator memory for checking the parity of said transmitted columns; and stop printing means connected to said parity checking means and said decoding circuitry to stop printing of said dot matrix printer when said parity checking means indicates no error and said decoding circuitry transmits an invalid indication signal whereby said printing is stopped when it is believed that said EOC bits are in error.

2. The invention of claim 1 wherein said selection means comprises:

a line buffer memory for sequentially storing a plurality of character matrix addresses for said series of character shapes to be printed;

a line buffer counter for sequentially addressing said line buffer memory in response to detection of said at least one EOC bit;

and wherein said transmission means comprises:

a character generator address counter for receiving said starting address from said line buffer memory in response to detection of said at least one EOC bit and for cooperating with said character generator memory for sequentially transmitting portions of said character matrix associated with said received starting address in said character generator address counter.

* * * * *